(12) United States Patent
Khan et al.

(10) Patent No.: US 7,991,063 B2
(45) Date of Patent: Aug. 2, 2011

(54) TRANSMISSION SYMBOLS MAPPING FOR ANTENNA DIVERSITY

(75) Inventors: Farooq Khan, Allen, TX (US);
Jiann-An Tsai, Plano, TX (US);
Jianzhong Zhang, Irving, TX (US)

(73) Assignee: Samsung Electronics Co., Ltd, Suwon-si (KR)

( * ) Notice: Subject to any disclaimer, the term of this patent is extended or adjusted under 35 U.S.C. 154(b) by 678 days.

(21) Appl. No.: 12/153,072

(22) Filed: May 13, 2008

(65) Prior Publication Data
US 2008/0304593 A1    Dec. 11, 2008

Related U.S. Application Data

(60) Provisional application No. 60/924,942, filed on Jun. 6, 2007.

(51) Int. Cl.
*H04K 1/10* (2006.01)
*H04L 27/28* (2006.01)

(52) U.S. Cl. ........ 375/260; 375/267; 375/299; 375/347; 455/500; 455/101; 370/206; 370/208

(58) Field of Classification Search .................. 375/260, 375/267, 299, 347; 455/500, 101; 370/206, 370/208
See application file for complete search history.

(56) References Cited

U.S. PATENT DOCUMENTS

| | | | | |
|---|---|---|---|---|
| 7,577,085 B1 * | 8/2009 | Narasimhan | | 370/206 |
| 7,623,441 B1 * | 11/2009 | Sampath et al. | | 370/206 |
| 7,720,168 B2 * | 5/2010 | Su et al. | | 375/267 |
| 7,724,639 B1 * | 5/2010 | Porat et al. | | 370/208 |
| 7,889,633 B2 * | 2/2011 | Noh et al. | | 370/208 |
| 2004/0257978 A1 * | 12/2004 | Shao et al. | | 370/208 |
| 2009/0303866 A1 * | 12/2009 | Li et al. | | 370/208 |

* cited by examiner

*Primary Examiner* — Phuong Phu

(57) ABSTRACT

Methods and apparatus for transmitting data via multiple antennas by using antenna diversity. A transmission diversity scheme is established such that two transmission matrices that are in accordance with the space frequency block code combined with Frequency switched transmit diversity (SFBC+FSTD) scheme, are alternatively applied in either the frequency domain, or the time domain, or both of the frequency domain or then time domain. The symbols in the transmission matrices may be transmitted either as one burst in a primary broadcast channel (PBCH), or as discrete bursts in the primary broadcast channel.

49 Claims, 11 Drawing Sheets

| Subcarriers | f1 | f2 | f3 | f4 | |
|---|---|---|---|---|---|
| ANT0 | $S_1$ | $S_2$ | | | First transmission (timeslot#1) |
| ANT1 | $-S_2^*$ | $S_1^*$ | | | |
| ANT2 | | | $S_3$ | $S_4$ | |
| ANT3 | | | $-S_4^*$ | $S_3^*$ | |

| Subcarriers | f1 | f2 | f3 | f4 | |
|---|---|---|---|---|---|
| ANT0 | $S_3$ | $S_4$ | | | Repetition (timeslot#2) |
| ANT1 | $-S_4^*$ | $S_3^*$ | | | |
| ANT2 | | | $S_1$ | $S_2$ | |
| ANT3 | | | $-S_2^*$ | $S_1^*$ | |

FIG. 2

|  | t1 | t2 |
|---|---|---|
| ANT 1 | $S_1$ | $-S_2^*$ |
| ANT 2 | $S_2$ | $S_1^*$ |

FIG. 3

|  | f1 | f2 |
|---|---|---|
| ANT 1 | $S_1$ | $-S_2^*$ |
| ANT 2 | $S_2$ | $S_1^*$ |

FIG. 4

|  | f1 | f2 |
|---|---|---|
| ANT 1 | $S_1$ | $S_2$ |
| ANT 2 | $-S_2^*$ | $S_1^*$ |

| Subcarriers | f1 | f2 | f3 | f4 | f5 | f6 | f7 | f8 |
|---|---|---|---|---|---|---|---|---|
| ANT0 | $S_1$ | $S_2$ | | | $S_3$ | $S_4$ | | |
| ANT1 | $-S_2^*$ | $S_1^*$ | | | $-S_4^*$ | $S_3^*$ | | |
| ANT2 | | | $S_3$ | $S_4$ | | | $S_1$ | $S_2$ |
| ANT3 | | | $-S_4^*$ | $S_3^*$ | | | $-S_2^*$ | $S_1^*$ |

← First transmission → ← Repetition →

FIG. 6

| Subcarriers | f1 | f2 | f3 | f4 | f5 | f6 | f7 | f8 | f9 | f10 | f11 | f12 | f13 | f14 | f15 | f16 |
|---|---|---|---|---|---|---|---|---|---|---|---|---|---|---|---|---|
| ANT0 | $S_1$ | $S_2$ | | | $S_3$ | $S_4$ | | | $S_1$ | $S_2$ | | | $S_3$ | $S_4$ | | |
| ANT1 | $-S_2^*$ | $S_1^*$ | | | $-S_4^*$ | $S_3^*$ | | | $-S_2^*$ | $S_1^*$ | | | $-S_4^*$ | $S_3^*$ | | |
| ANT2 | | | $S_3$ | $S_4$ | | | $S_1$ | $S_2$ | | | $S_3$ | $S_4$ | | | $S_1$ | $S_2$ |
| ANT3 | | | $-S_4^*$ | $S_3^*$ | | | $-S_2^*$ | $S_1^*$ | | | $-S_4^*$ | $S_3^*$ | | | $-S_2^*$ | $S_1^*$ |

First transmission: f1–f4
First Repetition: f5–f8
Second Repetition: f9–f12
Third Repetition: f13–f16

FIG. 7

| Subcarriers | f1 | f2 | f3 | f4 | f5 | f6 | f7 | f8 | f9 | f10 | f11 | f12 | f13 | f14 |
|---|---|---|---|---|---|---|---|---|---|---|---|---|---|---|
| | First transmission | | | | First Repetition | | | | Second Repetition | | | | Third Partial Repetition | |
| ANT0 | $S_1$ | $S_2$ | | | $S_3$ | $S_4$ | | | $S_1$ | $S_2$ | | | $S_3$ | $S_4$ |
| ANT1 | $-S_2^*$ | $S_1^*$ | | | $-S_4^*$ | $S_3^*$ | | | $-S_2^*$ | $S_1^*$ | | | $-S_4^*$ | $S_3^*$ |
| ANT2 | | | $S_3$ | $S_4$ | | | $S_1$ | $S_2$ | | | $S_3$ | $S_4$ | | |
| ANT3 | | | $-S_4^*$ | $S_3^*$ | | | $-S_2^*$ | $S_1^*$ | | | $-S_4^*$ | $S_3^*$ | | |

FIG. 8

| Subcarriers | f1 | f2 | f3 | f4 |
|---|---|---|---|---|
| ANT0 | $S_1$ | $S_2$ | | |
| ANT1 | $-S_2^*$ | $S_1^*$ | | |
| ANT2 | | | $S_3$ | $S_4$ |
| ANT3 | | | $-S_4^*$ | $S_3^*$ |

First transmission (timeslot#1)

| Subcarriers | f1 | f2 | f3 | f4 |
|---|---|---|---|---|
| ANT0 | $S_3$ | $S_4$ | | |
| ANT1 | $-S_4^*$ | $S_3^*$ | | |
| ANT2 | | | $S_1$ | $S_2$ |
| ANT3 | | | $-S_2^*$ | $S_1^*$ |

Repetition (timeslot#2)

FIG. 10

| Subcarriers | f1 | f2 | f3 | f4 | f5 | f6 | f7 | f8 |
|---|---|---|---|---|---|---|---|---|
| ANT0 | $S_1$ | $S_2$ | | | $S_3$ | $S_4$ | | |
| ANT1 | | | $S_3$ | $S_4$ | | | $S_1$ | $S_2$ |
| ANT2 | $-S_2^*$ | $S_1^*$ | | | $-S_4^*$ | $S_3^*$ | | |
| ANT3 | | | $-S_4^*$ | $S_3^*$ | | | $-S_2^*$ | $S_1^*$ |

← First transmission → ← Repetition →

FIG. 13

TRANSMISSION SYMBOLS MAPPING FOR ANTENNA DIVERSITY

CLAIM OF PRIORITY

This application makes reference to, claims all benefits accruing under 35 U.S.C. §119 from, and incorporates herein a U.S. Provisional Application entitled TRANSMISSION SYMBOLS MAPPING FOR ANTENNA DIVERSITY filed in the U.S. Patent & Trademark Office on 6 Jun. 2007 and there duly assigned Ser. No. 60/924,942.

BACKGROUND OF THE INVENTION

1. Field of the Invention

The present invention relates to a method for mapping transmission symbols into transmission resources in a communication system in order to utilize antenna diversity.

2. Description of the Related Art

A typical cellular radio system includes a number of fixed base stations and a number of mobile stations. Each base station covers a geographical area, which is defined as a cell.

Typically, a non-line-of-sight (NLOS) radio propagation path exists between a base station and a mobile station due to natural and man-made objects disposed between the base station and the mobile station. As a consequence, radio waves propagate while experiencing reflections, diffractions and scattering. The radio wave which arrives at the antenna of the mobile station in a downlink direction, or at the antenna of the base station in an uplink direction, experiences constructive and destructive additions because of different phases of individual waves generated due to the reflections, diffractions, scattering and out-of-phase recombination. This is due to the fact that, at high carrier frequencies typically used in a contemporary cellular wireless communication, small changes in differential propagation delays introduces large changes in the phases of the individual waves. If the mobile station is moving or there are changes in the scattering environment, then the spatial variations in the amplitude and phase of the composite received signal will manifest themselves as the time variations known as Rayleigh fading or fast fading attributable to multipath reception. The time-varying nature of the wireless channel require very high signal-to-noise ratio (SNR) in order to provide desired bit error or packet error reliability.

The scheme of diversity is widely used to combat the effect of fast fading by providing a receiver with multiple faded replicas of the same information-bearing signal.

The schemes of diversity in general fall into the following categories: space, angle, polarization, field, frequency, time and multipath diversity. Space diversity can be achieved by using multiple transmit or receive antennas. The spatial separation between the multiple antennas is chosen so that the diversity branches, i.e., the signals transmitted from the multiple antennas, experience fading with little or no correlation. Transmit diversity, which is one type of space diversity, uses multiple transmission antennas to provide the receiver with multiple uncorrelated replicas of the same signal. Transmission diversity schemes can further be divided into open loop transmit diversity and closed-loop transmission diversity schemes. In the open loop transmit diversity approach no feedback is required from the receiver. In one type of closed loop transmit diversity, a receiver knows an arrangement of transmission antennas, computes a phase and amplitude adjustment that should be applied at the transmitter antennas in order to maximize a power of the signal received at the receiver. In another arrangement of closed loop transmit diversity referred to as selection transmit diversity (STD), the receiver provides feedback information to the transmitter regarding which antenna(s) to be used for transmission.

An example of open-loop transmission diversity scheme is the Alamouti 2×1 space-time diversity scheme. The Alamouti 2×1 space-time diversity scheme contemplates transmitting a Alamouti 2×2 block code using two transmission antennas using either two time slots (i.e., Space Time Block Code (STBC) transmit diversity) or two frequency subcarriers (i.e., Space Frequency Block Code (SFBC) transmit diversity).

One limitation of Alamouti 2×1 space-time diversity scheme is that this scheme can only be applied to two transmission antennas. In order to transmit data using four transmission antennas, a Frequency Switched Transmit Diversity (FSTD) or a Time Switched Transmit Diversity (TSTD) is combined with block codes.

The problem with combined SFBC+FSTD scheme and STBC+TSTD schemes is that only a fraction of the total transmission antennas and hence power amplifier capability is used for transmission in a given frequency or time resource. This is indicated by '0' elements in the SFBC+FSTD and STBC+TSTD matrix given above. When the transmit power on the non-zero elements in the matrix is increased, bursty interference is generated to the neighboring cells degrading system performance. Generally, bursty interference manifests itself when certain phases of a frequency hopping pattern incur more interference than other phases.

SUMMARY OF THE INVENTION

It is therefore an object of the present invention to provide an improved method and transmitter circuit for transmitting data via multiple antennas.

It is another object to provide a method and transmitter circuit for transmitting data by using multiple antennas transmission diversity scheme.

According to one aspect of the present invention, a transmit diversity scheme is established for four symbols $S_1, S_2, S_3$ and $S_4$ such that two transmission matrices $T_1$ and $T_2$ are alternatively applied in a frequency domain. The two transmission matrices $T_1$ and $T_2$ are respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier.

The second row and the third row of each of the transmission matrices $T_1$ and $T_2$ may be exchanged, such that the symbols on the second row of each of the transmission matrices $T_1$ and $T_2$ are transmitted via the third antenna, and the symbols on the third row of each of the transmission matrices are transmitted via the second antenna.

The four symbols may be repeatedly transmitted in the frequency domain for two times, such that one of the two transmission matrices $T_1$ and $T_2$ is applied to the first transmission, and the other one of the two transmission matrices $T_1$ and $T_2$ is applied to the second transmission.

Alternatively, the four symbols may be repeatedly transmitted in the frequency domain for N times, with N being a positive number and N>1, such that one of the two transmission matrices $T_1$ and $T_2$ is applied to odd numbered transmissions, and the other one of the two transmission matrices $T_1$ and $T_2$ is applied to even numbered transmissions. In addition, the first through (N−1)-th transmissions may be full repetitions, and the N-th transmission may be a partial repetition.

The four symbols may be transmitted as a burst of signal in a primary broadcast channel, with the transmission being in accordance with the transmit diversity scheme.

According to another aspect of the present invention, a transmit diversity scheme is established for four symbols $S_1$, $S_2$, $S_3$ and $S_4$, by alternatively applying two transmission matrices $T_1$ and $T_2$ in a time domain.

The four symbols may be repeatedly transmitted in the time domain for two times, such that one of the two transmission matrices $T_1$ and $T_2$ is applied to the first transmission in a first time slot, and the other one of the two transmission matrices $T_1$ and $T_2$ is applied to the second transmission in a second time slot.

The symbols in both of the first time slot and the second time slot may be transmitted as one burst of signal in a primary broadcast channel transmission, with the first time slot and the second time slot being located within the same subframe.

Alternatively, the symbols in the first time slot may be transmitted as a first burst of signal in a primary broadcast channel transmission, and the symbols in the second time slot may be transmitted as a second burst of signal in the primary broadcast channel transmission, with the first burst and the second burst being separated by a certain time interval.

According to yet another aspect of the present invention, a transmit diversity scheme is established for four symbols $S_1$, $S_2$, $S_3$ and $S_4$ by alternatively applying two transmission matrices $T_1$ and $T_2$ in both of a time domain and a frequency domain.

The four symbols may be repeatedly transmitted over eight subcarriers and two time slots. In a first time slot, a first one of the transmission matrix matrices $T_1$ and $T_2$ is applied to the first four subcarriers, and a second one of the transmission matrix matrices $T_1$ and $T_2$ is applied to the last four subcarriers. In a second time slot, the second one of the transmission matrix matrices $T_1$ and $T_2$ is applied to the first four subcarriers, and the first one of the transmission matrix matrices $T_1$ and $T_2$ is applied to the last four subcarriers.

The symbols in the first and second time slots may be transmitted as one burst of signal in a primary broadcast channel transmission, with the first time slot and the second time slot being located within the same subframe.

Alternatively, the symbols in the first time slot may be transmitted as a first burst of signal in a primary broadcast channel transmission, and the symbols in the second time slot may be transmitted as a second burst of signal in the primary broadcast channel transmission, with the first burst and the second burst being separated by a certain time interval.

Still alternatively, the four symbols may be repeatedly transmitted for four times over eight subcarriers four time slots, such that: in a first time slot, a first one of the transmission matrix matrices $T_1$ and $T_2$ is applied to the first four subcarriers; in a second time slot, a second one of the transmission matrix matrices $T_1$ and $T_2$ being applied to the last four subcarriers; in a third time slot, the first one of the transmission matrix matrices $T_1$ and $T_2$ being applied to the first four subcarriers; and in a fourth time slot, the second one of the transmission matrix matrices $T_1$ and $T_2$ being applied to the last four subcarriers.

According to still another aspect of the present invention, when a first burst of signal and a second burst of signal is received within a radio subframe, the second burst of signal is decoded by applying a first space frequency block code format containing a transmission matrix $T_1$. If the second burst of signal is not successfully decoded, the first burst of signal and the second burst of signal are softly combined to generate a combined signal which is then decoded by applying the first space frequency block code format to the first burst of signal, and applying a second space frequency block code format containing a transmission matrix $T_2$ to the second burst of signal. If the combined signal is not successfully decoded, the second burst of signal is buffered.

According to still yet another aspect of the present invention, a transmit diversity scheme is established for four symbols $S_1$, $S_2$, $S_3$ and $S_4$ by alternatively applying two transmission matrices $T_1$ and $T_2$ in a frequency domain and/or a time domain. The two transmission matrices $T_1$ and $T_2$ are respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 schematically illustrates a Space Time Block Code transmission diversity scheme for two transmission antennas;

FIG. 3 schematically illustrates a Space Frequency Block Code transmission diversity scheme for two transmission antennas;

FIG. 4 schematically illustrates an alternative Space Frequency Block Code transmission diversity scheme for two transmission antennas;

FIG. 6 schematically illustrates a Space Frequency Block Code combined with Frequency Switched Transmit Diversity (SFBC+FSTD) scheme as one embodiment according to the principles of the present invention;

FIG. 7 schematically illustrates another Space Frequency Block Code combined with Frequency Switched Transmit Diversity (SFBC+FSTD) scheme as another embodiment according to the principles of the present invention;

FIG. 8 schematically illustrates still another Space Frequency Block Code combined with Frequency Switched Transmit Diversity (SFBC+FSTD) scheme as still another embodiment according to the principles of the present invention;

FIG. 10 schematically illustrates a Space Frequency Block Code combined with Frequency Switched Transmit Diversity (SFBC+FSTD) scheme as yet another embodiment according to the principles of the present invention;

FIG. 13 schematically illustrates a Space Frequency Block Code combined with Frequency Switched Transmit Diversity (SFBC+FSTD) scheme as a further embodiment according to the principles of the present invention.

DETAILED DESCRIPTION OF THE INVENTION

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

Figure 1:
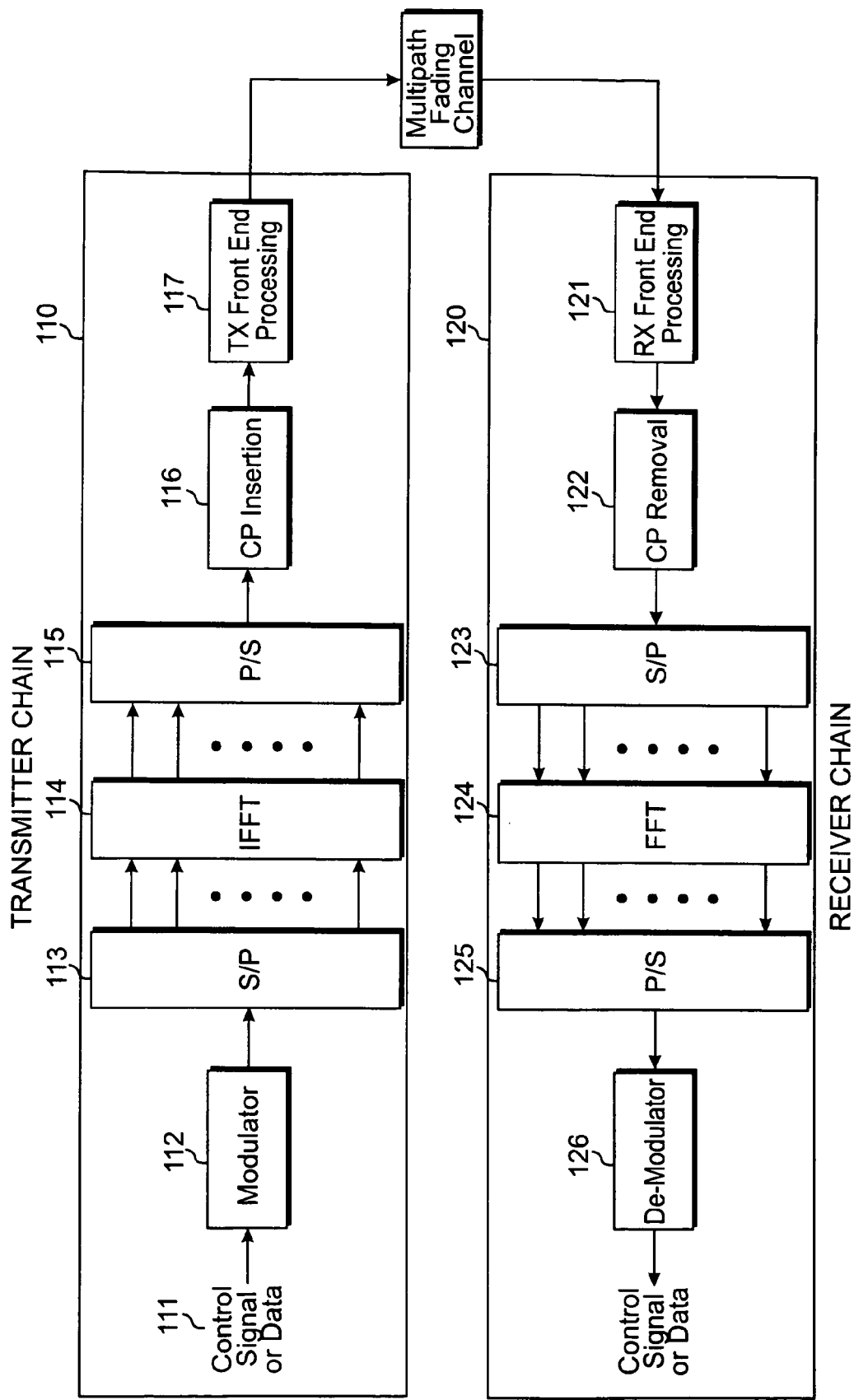
FIG. 1 schematically illustrates an Orthogonal Frequency Division Multiplexing (OFDM) transceiver chain suitable for the practice of the principles of the present inventions.

FIG. 1 illustrates an Orthogonal Frequency Division Multiplexing (OFDM) transceiver chain. In a communication system using OFDM technology, at transmitter chain 110, control signals or data 111 is modulated by modulator 112 and is serial-to-parallel converted by Serial/Parallel (S/P) converter 113. Inverse Fast Fourier Transform (IFFT) unit 114 is used to transfer the signal from frequency domain to time domain. Cyclic prefix (CP) or zero prefix (ZP) is added to each OFDM symbol by CP insertion unit 116 to avoid or mitigate the impact due to multipath fading. Consequently, the signal is transmitted by transmitter (Tx) front end processing unit 117, such as an antenna (not shown), or alternatively, by fixed wire or cable. At receiver chain 120, assuming perfect time and frequency synchronization are achieved, the signal received by receiver (Rx) front end processing unit 121 is processed by CP removal unit 122. Fast Fourier Transform (FFT) unit 124 transfers the received signal from time domain to frequency domain for further processing.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The scheme of diversity is widely used to combat the effect of fast fading by providing a receiver with multiple faded replicas of the same information-bearing signal. An example of open-loop transmission diversity scheme is the Alamouti 2×1 space-time block code (STBC) transmission diversity scheme as illustrated in FIG. 2. In this approach, during any symbol period, i.e., time period, a transmitter transmits two data symbols via two transmission antennas to a receiver. As shown in FIG. 2, during the first symbol interval t1, symbols $S_1$ and $S_2$ are respectively transmitted via antennas ANT 1 and ANT 2. During the next symbol period t2, symbols $-S^*_2$ and $S^*_1$ are respectively transmitted via antennas ANT 1 and ANT 2, where x* represents complex conjugate of x. After receiving the signals, the receiver performs a plurality of processes to recover original symbols $S_1$ and $S_2$. Note that the instantaneous channel gains g1 and g2 for ANT 1 and ANT 2, respectively, are required for processing at the receiver. Therefore, the transmitter needs to transmit separate pilot symbols via both the antennas ANT 1 and ANT 2 for channel gain estimation at the receiver. The diversity gain achieved by Alamouti coding is the same as that achieved in Maximum Ratio Combining (MRC).

The 2×1 Alamouti scheme can also be implemented in a space-frequency block code (SFBC) transmission diversity scheme as illustrated in FIG. 3. As shown in FIG. 3, symbols $S_1$ and $S_2$ are respectively transmitted to a receiver via antennas ANT 1 and ANT 2 on a first subcarrier having frequency f1 in an Orthogonal Frequency Division Multiplexing (OFDM) system, symbols $-S^*_2$ and $S^*_1$ are respectively transmitted via antennas ANT 1 and ANT 2 on a second subcarrier having frequency f2. Therefore a matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & -S_2^* \\ S_2 & S_1^* \end{bmatrix}, \quad (1)$$

The received signal at the receiver on subcarrier having frequency f1 is $r_1$, and the received signal at the receiver on subcarrier having frequency f2 is $r_2$. $r_1$ and $r_2$ can be written as:

$r_1 = h_1 s_1 + h_2 s_2 + n_1$ $r_2 = -h_1 s_2^* + h_2 s_1^* + n_2$ \quad (2)

where $h_1$ and $h_2$ are channel gains from ANT 1 and ANT 2 respectively. We also assume that the channel from a given antennas does not change between subcarrier having frequency $f_1$ and subcarrier having frequency $f_2$. The receiver performs equalization on the received signals and combines the two received signals ($r_1$ and $r_2$) to recover the symbols $S_1$ and $S_2$. The recovered symbols $\hat{S}_1$ and $\hat{S}_2$ can be written as:

$\hat{s}_1 = h^*_1 r_1 + h_2 r^*_2$ $= h^*_1 (h_1 s_1 + h_2 s_2 + n_1) + h_2 (-h_1 s^*_2 + h_2 s^*_1 + n_2)^*$ $= (|h_1|^2 + |h_2|^2) s_1 + h^*_1 n_1 + h_2 n^*_2$ $\hat{s}_2 = h^*_2 r_1 + h_1 r^*_2$ $= h^*_2 (h_1 s_1 + h_2 s_2 + n_1) + h_1 (-h_1 s^*_2 + h_2 s^*_1 + n_2)^*$ $= (|h_1|^2 + |h_2|^2) s_2 + h^*_2 n_1 + h_1 n^*_2$ \quad (3)

It can be seen that both of the transmitted symbols $\hat{S}_1$ and $\hat{S}_2$ achieve full spatial diversity, that is, the each of the transmitted symbols $\hat{S}_1$ and $\hat{S}_2$ completely removes an interference from the other one.

An alternative mapping for two transmission antennas SFBC scheme is shown in FIG. 4. A matrix of transmitted symbols from antennas ANT 1 and ANT 2 can be written as:

$$\begin{bmatrix} T_{11} & T_{12} \\ T_{21} & T_{22} \end{bmatrix} = \begin{bmatrix} S_1 & S_2 \\ -S_2^* & S_1^* \end{bmatrix}, \quad (4)$$

The transmit matrix in Equation (7) for the scheme in FIG. 4 is a transpose of the transmit matrix in Equation (4) for the scheme shown in FIG. 3.

Other proposals found in the art for four transmission antennas transmit diversity combines Frequency Switched Transmit Diversity (FSTD) or Time Switched Transmit Diversity (TSTD) with block codes. In case of combined SFBC+FSTD scheme or STBC+TSTD scheme, the matrix of the transmitted symbols from the four transmission antennas are given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}. \quad (5)$$

where $T_{ij}$ represents symbol transmitted on the ith antenna and the jth subcarrier or jth time slot, and i=1, 2, 3, 4, j=1, 2, 3, 4 for the case of four transmission antennas. A and B are block codes given as below.

$$A = \frac{1}{\sqrt{2}} \begin{bmatrix} S_1 & S_2 \\ -S_2^* & S_1^* \end{bmatrix} \quad (6)$$

$$B = \frac{1}{\sqrt{2}} \begin{bmatrix} S_3 & S_4 \\ -S_4^* & S_3^* \end{bmatrix}$$

The problem with combined SFBC+FSTD scheme and STBC+TSTD schemes is that only a fraction of the total transmission antennas and hence power amplifier (PA) capability is used for transmission in a given frequency or time resource. This is indicated by '0' elements in the SFBC+FSTD and STBC+TSTD matrix given above. When the transmit power on the non-zero elements in the matrix is increased, bursty interference is generated to the neighboring cells degrading system performance.

In a previous U.S. patent application titled "Transmit Diversity in a Wireless communication System", filed on 27 Dec. 2007, U.S. patent application Ser. No. 12/005,341, an open-loop transmit diversity scheme where Alamouti block code is spread with an orthogonal function to provide diversity for cases of more than two transmission antennas is proposed. An example of orthogonal functions uses columns of a Fourier matrix.

A Fourier matrix is a N×N square matrix with entries given by:

$$P_N = e^{j2\pi mn/N} m, n = 0, 1, \ldots (N-1) \quad (7)$$

For example, a 2×2 Fourier matrix can be expressed as:

$$P_2 = \begin{bmatrix} 1 & 1 \\ 1 & e^{j\pi} \end{bmatrix} = \begin{bmatrix} 1 & 1 \\ 1 & -1 \end{bmatrix}. \quad (8)$$

Similarly, a 4×4 Fourier matrix can be expressed as:

$$P_4 = \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \begin{bmatrix} 1 & 1 & 1 & 1 \\ 1 & j & -1 & -j \\ 1 & -1 & 1 & -1 \\ 1 & -j & -1 & j \end{bmatrix} \quad (9)$$

Multiple Fourier matrices can be defined by introducing a shift parameter (g/G) in the Fourier matrix. The entry of the multiple Fourier matrices is given by:

$$P_{mn} = e^{j2\pi \frac{m}{N} \cdot (n + \frac{g}{G})} \ m, n = 0, 1, \ldots (N-1) \quad (10)$$

A set of four 2×2 Fourier matrices can be defined by taking G=4, and g=0, 1, 2 and 3 are written as:

$$P_2^0 = \begin{bmatrix} 1 & 1 \\ 1 & -1 \end{bmatrix}, \quad (11)$$

$$P_2^1 = \begin{bmatrix} 1 & 1 \\ e^{j\pi/4} & -e^{j\pi/4} \end{bmatrix},$$

$$P_2^2 = \begin{bmatrix} 1 & 1 \\ e^{j\pi/2} & -e^{j\pi/2} \end{bmatrix},$$

$$P_2^3 = \begin{bmatrix} 1 & 1 \\ e^{j3\pi/4} & -e^{j3\pi/4} \end{bmatrix}.$$

Note that in addition to the set of four Fourier matrices listed above, we can also apply row or column permuted versions of these set of Fourier matrices. For example, the row and column permutations of the matrix $P_2^0$ is given by:

$$P_2^5 = \frac{1}{\sqrt{2}} \begin{bmatrix} 1 & 1 \\ -1 & 1 \end{bmatrix}, \quad (12)$$

$$P_2^6 = \frac{1}{\sqrt{2}} \begin{bmatrix} 1 & -1 \\ 1 & 1 \end{bmatrix}$$

For each Fourier matrix, there are two permuted versions. So the total number of the spread matrix P is 12.

We assume that four symbols $S_1$, $S_2$, $S_3$ and $S_4$ are transmitted on four subcarriers using four transmit antennas. Let us define matrix A and B as below:

$$A = \frac{1}{\sqrt{2}} \begin{bmatrix} S_1 & -S_2^* \\ S_2 & S_1^* \end{bmatrix} \quad (13)$$

$$B = \frac{1}{\sqrt{2}} \begin{bmatrix} S_3 & -S_4^* \\ S_4 & S_3^* \end{bmatrix}$$

It can be seen that each matrix A and B is an Alamouti code for symbols ($S_1$, $S_2$) and symbols ($S_3$, $S_4$) respectively. We construct a 2×2 matrix with A and B as its elements and perform an element-by-element multiplication with an expanded 2×2 Fourier matrix as below.

$$T_i = \frac{1}{\sqrt{2}} \begin{bmatrix} A & A \\ B & B \end{bmatrix} .* \left( P_2^i \otimes \begin{bmatrix} 1 & 1 \\ 1 & 1 \end{bmatrix} \right), \quad (14)$$

for $i = 1, \ldots, 12$.

Note that the operator .* denotes element-wise multiplication and $\otimes$ denotes kronecker product. For i=0 case, the resulting 4×4 matrix denoting discrete Fourier transform (DFT)-spread SFBC or DFT-spread STBC is given as below:

$$T_0 = \frac{1}{\sqrt{2}} \begin{bmatrix} A & A \\ B & B \end{bmatrix} .* \left( P_2^0 \otimes \begin{bmatrix} 1 & 1 \\ 1 & 1 \end{bmatrix} \right) \quad (15)$$

$$= \frac{1}{\sqrt{2}} \begin{bmatrix} A & A \\ B & B \end{bmatrix} .* \left( \frac{1}{\sqrt{2}} \begin{bmatrix} 1 & 1 \\ 1 & -1 \end{bmatrix} \otimes \begin{bmatrix} 1 & 1 \\ 1 & 1 \end{bmatrix} \right)$$

$$= \frac{1}{\sqrt{4}} \begin{bmatrix} S_1 & S_2 & S_1 & S_2 \\ -S_2^* & S_1^* & -S_2^* & S_1^* \\ S_3 & S_4 & -S_3 & -S_4 \\ -S_4^* & S_3^* & S_4^* & -S_3^* \end{bmatrix}$$

It can be seen that in this scheme transmission takes place simultaneously from all the transmit antennas and all the subcarriers. This spreading of the transmitted symbols results in averaging of the inter-cell interference thuds improving system performance and throughput.

Figure 5:
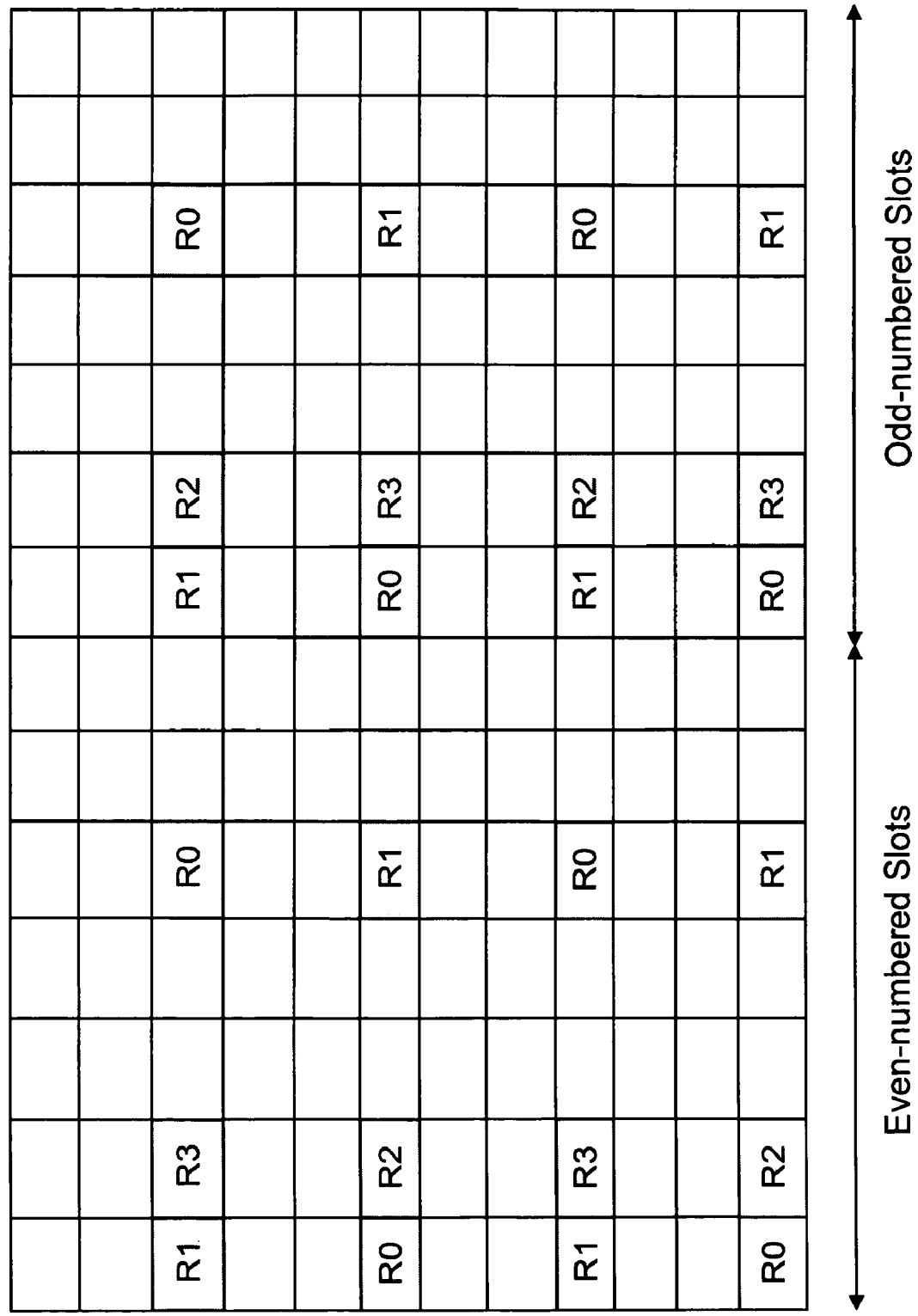
FIG. 5 schematically illustrates mapping of downlink reference signals in a contemporary $3^{rd}$ Generation Partnership Project Long Term Evolution system.

The downlink reference signals mapping for four transmission antennas in the 3GPP LTE (3$^{rd}$ Generation Partnership Project Long Term Evolution) system is shown in FIG. 5. The notation $R_p$ is used to denote a resource element used for reference signal transmission on antenna port p. It can be noted that density on antenna ports 2 and 3 is half the density on antenna ports 0 and 1. This leads to weaker channel estimates on antenna ports 2 and 3 relative to channel estimates on antenna ports 0 and 1.

In the current invention we describe an open-loop transmission diversity scheme where Alamouti block code is spread with an orthogonal function to provide diversity for transmissions via more than two transmission antennas. We will describe the invention assuming a Fourier matrix. It should be noted that the principles of the current invention can be easily extended and applied to the cases of other orthogonal functions such as Hadamard function or Zadoff-Chu (ZC) sequences.

In a previous U.S. patent application titled "Antenna Mapping in a MIMO Wireless communication System", filed on 11 Jan. 2008, U.S. patent application Ser. No. 12/007,586, an alternative mapping scheme for SFBC-FSTD scheme is proposed. In the proposed scheme, symbols ($S_1$, $S_2$) are transmitted over antennas ports 0 and 2, while symbols ($S_3$, $S_4$) are transmitted over antenna ports 1 and 3 as given by the transmit matrix below:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix}, \quad (16)$$

where $T_{ij}$ represents symbol transmitted on the (i-1)th antenna port and the jth subcarrier or jth time slot (i=1, 2, 3, 4, j=1, 2, 3, 4) for the case of 4-Tx antennas. It can be noted that this mapping result in averaging of the unequal channel estimation error effect across the transmitted symbols.

In a first embodiment according to the principles of the present invention, we propose a SFBC-FSTD scheme where mapping of symbols to antennas is changed on repeated symbols as shown in FIG. 6. In this example we assumed that four symbols $S_1$, $S_2$, $S_3$ and $S_4$ are transmitted with one repetition over eight subcarriers. In the first four subcarriers, symbols $S_1$ and $S_2$ are transmitted on antennas ports ANT0 and ANT1, while symbols $S_3$ and $S_4$ are transmitted on antennas ports ANT2 and ANT3. On repetition in the next four subcarriers, the symbols $S_1$ and $S_2$ are transmitted on antennas ports ANT2 and ANT3, while symbols $S_3$ and $S_4$ are transmitted on antennas ports ANT0 and ANT1. This proposed mapping results in greater diversity gain compared to the transmission where mapping does not change on repetition. This diversity gains stems from the fact that after one repetition all the four symbols are transmitted from all the four transmit antennas.

In the proposed mapping scheme in the first embodiment of the present invention, the transmission matrix $T_1$ shown below is used for initial transmission:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix} \quad (17)$$

where $T_{ij}$ represents symbol transmitted on the ith antenna and the jth subcarrier or jth time slot (i=1, 2, 3, 4, j=1, 2, 3, 4) for the case of 4-Tx antennas. When the same symbols are repeated, a different mapping matrix $T_2$ shown below is used for transmission:

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix} \quad (18)$$

In a second embodiment according to the principles of the present invention as shown in FIG. 7, the transmitted symbols $S_1$, $S_2$, $S_3$ and $S_4$ are repeated three times. In this case, the transmission matrix $T_1$ is used for first transmission and second repetition, while the transmission matrix $T_2$ is used for first and third repetitions.

In a third embodiment according to the principles of the present invention as shown in FIG. 8, the transmitted symbols $S_1$, $S_2$, $S_3$ and $S_4$ are repeated N>2 times, where the N-1 repetitions are 'full repetition' and the last one is partial repetition in that only part of the symbols S1, S2, S3 and S4 are repeated. As shown in FIG. 8, the first and second repetitions are full repetitions while the third repetition is a partial repetition. The two transmission matrices T1 and T2 are applied to these N repetitions in an alternating fashion, such that the first repetition uses T1, second repetition uses T2, etc.

In a fourth embodiment according to the principles of the present invention, the transmitted symbols $S_1$, $S_2$, $S_3$ and $S_4$ in FIG. 6 and FIG. 7, as well as their repetitions, belong to one burst of the primary broadcast channel (P-BCH, also known as common control physical channel (CCPCH)). The transmission structure of the P-BCH channel is illustrated in FIG. 8, for an example where two bursts spaced 20 ms apart are transmitted in a 40 ms interval. Within each burst, there are several repetitions of the interleaved codeword C. All repetitions of these codewords are QPSK modulated. That is, the information to be transmitted is first encoded and then interleaved. An interleaver can be as simple as writing data in rows and reading out data in columns. An interleaved codeword is the coded and interleaved information. With QPSK modulation, each pair of coded bits is mapped to a QPSK symbol. As shown in FIG. 6 and FIG. 7, repetitions of the modulated codeword is assigned different SFBC–FSTD schemes as the modulated symbols are mapped to physical resource elements.

Figure 9:
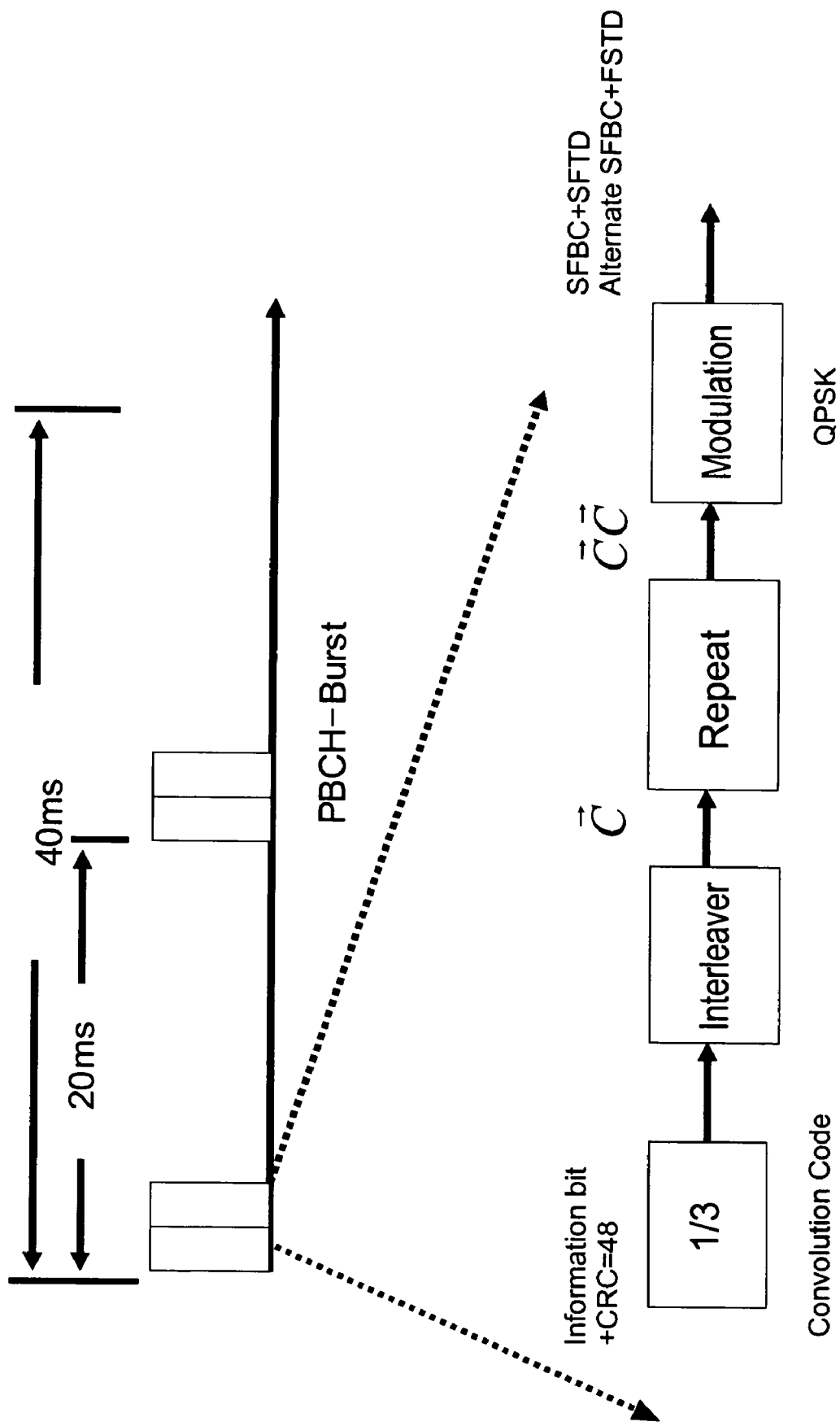
FIG. 9 schematically illustrates a transmission structure of the primary broadcast channel (PBCH)

In a fifth embodiment according to the principles of the present invention as shown in FIG. 9, the transmitted symbols $S_1$, $S_2$, $S_3$ and $S_4$ are repeated once. The four symbols are transmitted over four subcarriers and two timeslots. In this case, transmission matrix $T_1$ is used for first transmission in the first timeslot while transmission matrix $T_2$ is used for first repetition in the second timeslot.

In a sixth embodiment according to the principles of the present invention, the total number of time slots FIG. 9 are four, including first transmission, second transmission, third transmission and fourth transmission, and these transmissions are separated in time. That is, these transmissions are separated from each other by a certain time interval, during which none of the first transmission, second transmission, third transmission or fourth transmission occurs.

In a seventh embodiment according to the principles of the present invention, the transmitted symbols in both the first timeslot and second timeslot in FIG. 9 belong to the first burst of the PBCH transmission shown in FIG. 8. In this case, these two timeslots locates in the same 1 ms subframe.

In an eighth embodiment according to the principles of the present invention, the transmitted symbols in the first timeslot in FIG. 9 belong to the first burst of the PBCH transmission shown in FIG. 8. Meanwhile, the transmitted symbols in the second timeslot in FIG. 9 belong to the second burst of the PBCH transmission shown in FIG. 8.

In a ninth embodiment according to the principles of the present invention as shown in FIG. 10, the transmitted symbols $S_1$, $S_2$, $S_3$ and $S_4$ are repeated three times with a total number of transmissions of four. The four symbols are transmitted over eight subcarriers and two timeslots. In this case, the transmission matrix $T_1$ is used for the first transmission and first repetition (i.e., the second transmission) in the first timeslot, while the transmission matrix $T_2$ is used for the second repetition (i.e., the third transmission) and the third repetition (i.e., the fourth transmission) in the second timeslot.

In a tenth embodiment according to the principles of the present invention, the total number of time slots are four, including first transmission, second transmission, third transmission and fourth transmission, and these transmissions are separated in time. That is, the four symbols $S_1$, $S_2$, $S_3$ and $S_4$ are repeatedly transmitted for four times over eight subcarriers and four timeslots, such that: the four symbols are first transmitted over subcarriers f1~f4 in Timeslot #1 (the first transmission); the four symbols are secondly transmitted over subcarriers f5~f8 in Timeslot #2 (the second transmission); the four symbols are thirdly transmitted over subcarriers f1~f4 in Timeslot #3 (the third transmission); and the four symbols are fourthly transmitted over subcarriers f5~f8 in Timeslot #4 (the fourth transmission). Note that this embodiment can be extended by a transmission of four symbols over sixteen subcarriers in two time slots. In this case, the total number of transmissions is eight, since four subcarriers in one time slot are used for one transmission.

In an eleventh embodiment according to the principles of the present invention, the transmitted symbols in both the first timeslot and second timeslot in FIG. 10 belong to the first burst of the PBCH transmission shown in FIG. 8. In this case, these two timeslots live in the same 1 ms subframe.

In a twelfth embodiment according to the principles of the present invention, the transmitted symbols in the first timeslot in FIG. 10 belong to the first burst of the PBCH transmission shown in FIG. 8; meanwhile, the transmitted symbols in the second timeslot in FIG. 10 belong to the second burst of the PBCH transmission shown in FIG. 8.

An example of six symbols transmitted over six antennas in six subcarriers is given below. Three transmission matrices $T_1$, $T_2$, $T_3$ can be respectively established as:

$$T_1 = \begin{bmatrix} S_1 & -S_2^* & 0 & 0 & 0 & 0 \\ S_2 & S_1^* & 0 & 0 & 0 & 0 \\ 0 & 0 & S_3 & -S_4^* & 0 & 0 \\ 0 & 0 & S_4 & S_3^* & 0 & 0 \\ 0 & 0 & 0 & 0 & S_5 & -S_6^* \\ 0 & 0 & 0 & 0 & S_6 & S_5^* \end{bmatrix}, \quad (19)$$

$$T_2 = \begin{bmatrix} S_5 & -S_6^* & 0 & 0 & 0 & 0 \\ S_6 & S_5^* & 0 & 0 & 0 & 0 \\ 0 & 0 & S_1 & -S_2^* & 0 & 0 \\ 0 & 0 & S_2 & S_1^* & 0 & 0 \\ 0 & 0 & 0 & 0 & S_3 & -S_4^* \\ 0 & 0 & 0 & 0 & S_4 & S_3^* \end{bmatrix}, \quad (20)$$

$$T_3 = \begin{bmatrix} S_3 & -S_4^* & 0 & 0 & 0 & 0 \\ S_4 & S_3^* & 0 & 0 & 0 & 0 \\ 0 & 0 & S_5 & -S_6^* & 0 & 0 \\ 0 & 0 & S_6 & S_5^* & 0 & 0 \\ 0 & 0 & 0 & 0 & S_1 & -S_2^* \\ 0 & 0 & 0 & 0 & S_2 & S_1^* \end{bmatrix}. \quad (21)$$

The three transmission matrices $T_1$, $T_2$, $T_3$ can be used on the first, second and third transmission, respectively. In this way, each modulation symbols is transmitted over all of the six antennas and thus capturing six-antenna transmit diversity.

Figure 11:
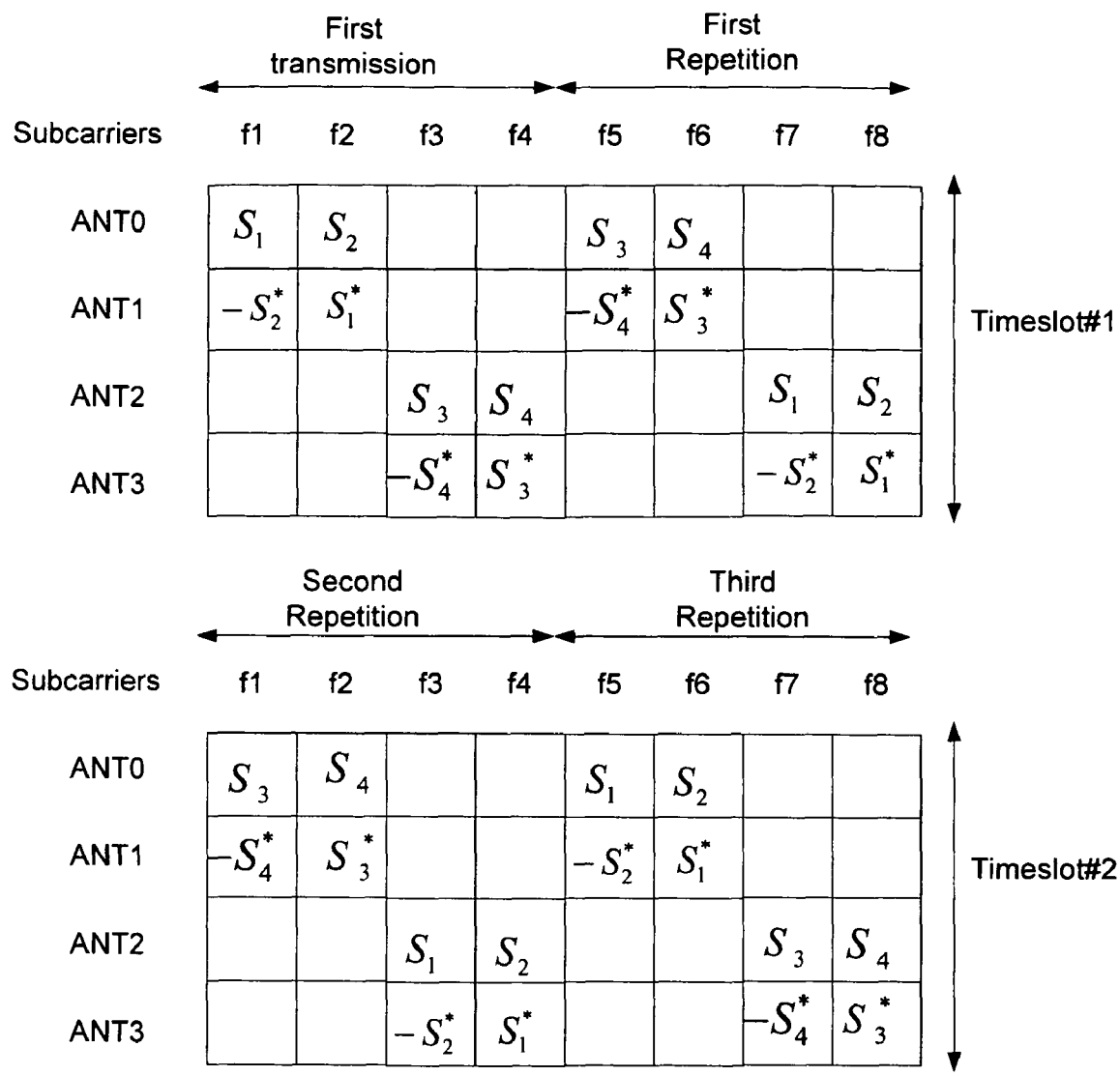
FIG. 11 schematically illustrates a Space Frequency Block Code combined with Frequency Switched Transmit Diversity (SFBC+FSTD) scheme as still another embodiment according to the principles of the present invention.
Figure 12:
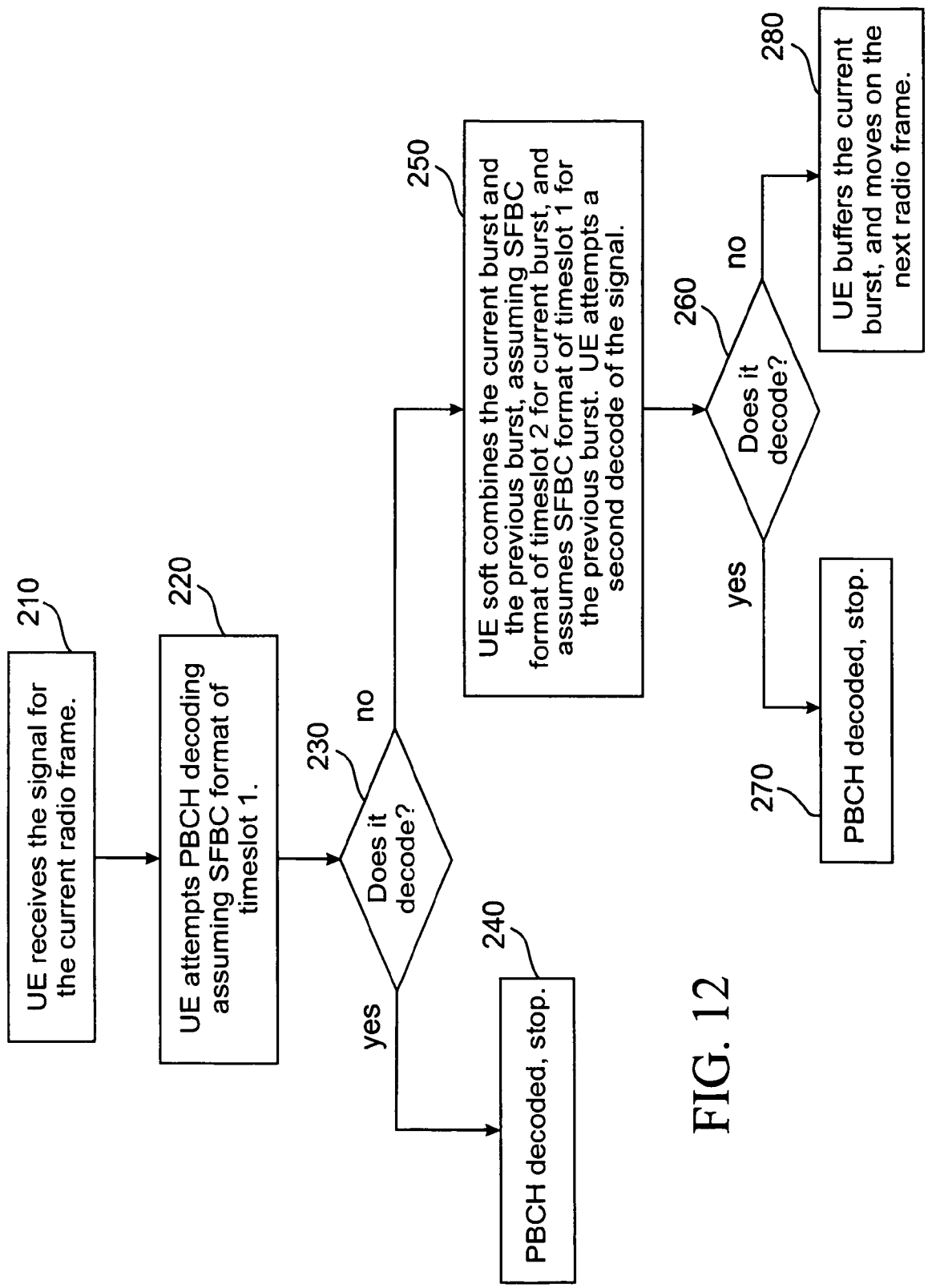
FIG. 12 schematically illustrates procedures for PBCH burst timing recovery according to one embodiment of the principles of the present invention.

In a thirteenth embodiment according to the principles of the present invention, when there are only two PBCH bursts that are spaced 20 ms apart, and these two PBCH bursts are carried using different SFBC+FSTD formats as shown in FIG. 10 and FIG. 11, the PBCH burst timing (the transmission frame timing) can be obtained by hypothesis testing against these two different SFBC+FSTD formats. For example, if matrix $T_1$ is used in the first 5 msec of a 10 msec frame, and matrix $T_2$ is used in the second 5 msec of the 10 msec frame. Then, on successful decoding, the receiver can determine where the 10 msec frame boundary starts. The receiver flowchart for timing identification is shown in FIG. 12. First, a unit of user equipment (UE) receives the PBCH signal at the current radio frame from a base station (BS) (step 210). The current radio frame contains the two PBCH bursts that are spaces 20 ms apart. The UE attempts to decode the PBCH signal at the current frame by assuming the SFBC format of time slot #1 as shown in FIG. 10 or FIG. 11 (step 220). Then, the UE determines whether the PBCH signal is successfully decoded (step 230). When the PBCH signal is successfully decoded, the UE stops the decoding procedure (step 240). Otherwise, the UE soft combines the current burst and the previous burst, and attempts to decode the combined signal by assuming SFBC format of time slot #2 for the current burst, and assuming the SFBC format of time slot 1 for the previous burst (step 250). Soft combining means that the UE combines the modulation symbols and hence the energy received in the two time slots. Then, the UE determines whether the PBCH signal is successfully decoded (step 260). When the PBCH signal is successfully decoded, the UE stops the decoding procedure (step 270). Otherwise, the UE buffers the current burst, and moves on to the next radio frame (step 280).

In a fourteenth embodiment according to the principles of the present invention, the transmission matrices $T_1$ and $T_2$ are permuted:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{bmatrix} \quad (22)$$

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ 0 & 0 & S_1 & S_2 \\ -S_4^* & S_3^* & 0 & 0 \\ 0 & 0 & -S_2^* & S_1^* \end{bmatrix} \quad (23)$$

In these above permuted transmission matrices, in the transmission matrix $T_1$, symbols $S_1$ and $S_2$ are mapped to antenna ports ANT0 and ATN2 while symbols $S_3$ and $S_4$ are mapped to antenna ports ANT1 and ANT3. And in the transmission matrix $T_2$, symbols $S_1$ and $S_2$ are mapped to antenna ports ANT1 and ANT3, while symbols $S_3$ and $S_4$ are mapped to antenna ports ANT0 and ANT2. All the mapping schemes in FIGS. 6, 7, 10 and 11 are modified accordingly to reflect the change in the transmission matrix. For example, FIG. 13 is a modification of FIG. 6 with the permuted transmission matrix, where the transmitted symbols $S_1$, $S_2$, $S_3$ and $S_4$ are repeated once with a total number of transmissions of two. The four symbols are transmitted over eight subcarriers. In this case, symbol $S_1$ and $S_2$ are mapped to antenna ports ANT0 and ATN2 while symbols $S_3$ and $S_4$ are mapped to antenna ports ANT1 and ATN3. On repetition, symbol $S_1$ and $S_2$ are mapped to antenna ports ANT1 and ATN3 while symbols $S_3$ and $S_4$ are mapped to antenna ports ANT0 and ATN2.

In a fifteenth embodiment according to the principles of the present invention, the transmitted symbols $S_1$, $S_2$, $S_3$ and $S_4$ are repeated according to FIG. 7, except that symbols $S_1$ and $S_2$ are mapped to antenna ports ANT0 and ATN2 while symbols $S_3$ and $S_4$ are mapped to antenna ports ANT1 and ANT3. On repetition, symbols $S_1$ and $S_2$ are mapped to antenna ports ANT1 and ATN3 while symbols $S_3$ and $S_4$ are mapped to antenna ports ANT0 and ANT2.

In a sixteenth embodiment according to the principles of the present invention, the transmission matrices $T_1$ and $T_2$ can be defined as below:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix} \quad (24)$$

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix} \quad (25)$$

The matrix $T_2$ is obtained by inter-changing the second and third rows in $T_1$.

While the above embodiment of the present invention has been shown to transmit four data symbols $S_1$, $S_2$, $S_3$ and $S_4$, the present invention is not limited to the transmission of four data symbols. That is, any mount of data can be transmitted by applying the above proposed transmission schemes. The total symbols need to be divided into groups of four symbols and then the proposed transmission schemes can be applied to each of the four symbols. Note that in an OFDM system, there are a large number of subcarriers, such as 600 subcarriers in a LTE 10 MHz system. Therefore, each group of four symbols can be repeated a few times. Moreover, there are multiple OFDM symbols within a subframe and each OFDM symbol contains 600 subcarriers in the above example. Therefore, the total number of symbols that can be transmitted over 600 subcarriers can be large.

Moreover, the present invention can be applied to transmissions over more than four antennas, such as eight antennas. In addition, the transmission scheme can be applied at both a base station (BS) and a user equipment (UE).

While the present invention has been shown and described in connection with the preferred embodiments, it will be apparent to those skilled in the art that modifications and variations can be made without departing from the spirit and scope of the invention as defined by the appended claims.

What is claimed is:
1. A method for transmission in a communication system, the method comprising:
modulating data to be transmitted by using a certain modulation scheme to generate a plurality of modulated symbols;
establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a frequency domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and
transmitting the four symbols $S_1$, $S_2$, $S_3$ and $S_4$ via four antennas in accordance with the transmit diversity scheme.

2. The method of claim 1, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

3. The method of claim 1, comprised of the transmit diversity scheme being established such that the four symbols are repeatedly transmitted in the frequency domain for two times, with:
one of the two transmission matrices $T_1$ and $T_2$ being applied to the first transmission; and
the other one of the two transmission matrices $T_1$ and $T_2$ being applied to the second transmission.

4. The method of claim 3, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

5. The method of claim 1, comprised of the transmit diversity scheme being established such that the four symbols are repeatedly transmitted in the frequency domain for N times, with N being a positive number and N>1, with:
one of the two transmission matrices $T_1$ and $T_2$ being applied to odd numbered transmissions; and
the other one of the two transmission matrices $T_1$ and $T_2$ being applied to even numbered transmissions.

6. The method of claim 5, comprised of:
the first through (N−1)-th transmissions being full repetitions; and
the N-th transmission being a partial repetition.

7. The method of claim 5, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

8. The method of claim 1, comprised of transmitting the four symbols as a burst of signal in a primary broadcast channel, with the transmission being in accordance with the transmit diversity scheme.

9. The method of claim 8, comprised of transmitting two bursts in a certain time interval, with the transmission of each burst being in accordance with the transmit diversity scheme.

10. A method for transmission in a communication system, the method comprising the steps of:
calculating cyclic redundancy checks for a plurality of information bits to be transmitted;
appending the calculated cyclic redundancy checks to the plurality of information bits to generate a transport block;
convolving the transport block by applying a convolution code to the transport block to generate a convolved transport block;
interleaving the convolved transport block to generated an interleaved codeword;
repeating the interleaved codeword for several times;
modulating the repeated interleaved codewords by using a certain modulation scheme to generate a plurality of modulated symbols;
establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a frequency domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and
transmitting the four symbols $S_1$, $S_2$, $S_3$ and $S_4$ via four antennas as a burst of signal in a primary broadcast channel, with the transmission being in accordance with the transmit diversity scheme.

11. The method of claim 10, further comprising transmitting two bursts in a certain time interval, with the transmission of each burst being in accordance with the transmit diversity scheme.

12. A method for transmission in a communication system, the method comprising:
modulating data to be transmitted by using a certain modulation scheme to generate a plurality of modulated symbols;
establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a time domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and
transmitting the four symbols $S_1$, $S_2$, $S_3$ and $S_4$ via four antennas in accordance with the transmit diversity scheme.

13. The method of claim 12, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

14. The method of claim 12, comprised of the transmit diversity scheme being established such that the four symbols are repeatedly transmitted in the time domain for two times, with:

one of the two transmission matrices $T_1$ and $T_2$ being applied to the first transmission in a first time slot; and the other one of the two transmission matrices $T_1$ and $T_2$ being applied to the second transmission in a second time slot.

15. The method of claim 14, comprised of transmitting the symbols in both of the both of the first time slot and the second time slot as one burst of signal in a primary broadcast channel transmission, with the first time slot and the second time slot being located within the same subframe.

16. The method of claim 14, comprised of:

transmitting the symbols in the first time slot as a first burst of signal in a primary broadcast channel transmission; and transmitting the symbols in the second time slot as a second burst of signal in the primary broadcast channel transmission, with the first burst and the second burst being separated by a certain time interval.

17. The method of claim 14, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

18. The method of claim 12, comprised of the transmit diversity scheme being established such that the four symbols are repeatedly transmitted in the time domain for a plurality of times, with:

one of the two transmission matrices $T_1$ and $T_2$ being applied to the odd numbered transmissions in odd numbered time slots; and the other one of the two transmission matrices $T_1$ and $T_2$ being applied to the even numbered transmissions in even numbered time slots.

19. The method of claim 18, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

20. A method for transmission in a communication system, the method comprising:

modulating data to be transmitted by using a certain modulation scheme to generate a plurality of modulated symbols;

establishing a transmit diversity scheme for at least a group of four symbols $S_1$, $S_2$, $S_3$ and $S_4$ from among the plurality of modulated symbols by alternatively applying two transmission matrices $T_1$ and $T_2$ in both of a time domain and a frequency domain, with the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and

-continued $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and transmitting the four symbols $S_1$, $S_2$, $S_3$ and $S_4$ via four antennas in accordance with the transmit diversity scheme.

21. The method of claim 20, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

22. The method of claim 20, with the transmit diversity scheme being established such that the four symbols are repeatedly transmitted in the frequency domain over eight subcarriers, and are repeatedly transmitted in the time domain for two times over two time slots, with:

in a first time slot, a first one of the transmission matrix matrices $T_1$ and $T_2$ being applied to the first four subcarriers, and a second one of the transmission matrix matrices $T_1$ and $T_2$ being applied to the last four subcarriers; and in a second time slot, the second one of the transmission matrix matrices $T_1$ and $T_2$ being applied to the first four subcarriers, and the first one of the transmission matrix matrices $T_1$ and $T_2$ being applied to the last four subcarriers.

23. The method of claim 22, comprised of transmitting the symbols in the first and second time slots as one burst of signal in a primary broadcast channel transmission, with the first time slot and the second time slot being located within the same subframe.

24. The method of claim 22, comprised of:

transmitting the symbols in the first time slot as a first burst of signal in a primary broadcast channel transmission; and transmitting the symbols in the second time slot as a second burst of signal in the primary broadcast channel transmission, with the first burst and the second burst being separated by a certain time interval.

25. The method of claim 22, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

26. The method of claim 20, with the transmit diversity scheme being established such that the four symbols are repeatedly transmitted for four times over eight subcarriers four time slots, with:

in a first time slot, a first one of the transmission matrix matrices $T_1$ and $T_2$ being applied to the first four subcarriers;

in a second time slot, a second one of the transmission matrix matrices $T_1$ and $T_2$ being applied to the last four subcarriers;

in a third time slot, the first one of the transmission matrix matrices $T_1$ and $T_2$ being applied to the first four subcarriers; and in a fourth time slot, the second one of the transmission matrix matrices $T_1$ and $T_2$ being applied to the last four subcarriers.

27. The method of claim 26, further comprising exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

28. A method for decoding signal in a communication system, the method comprising the steps of:

receiving a first burst of signal and a second burst of signal within a radio subframe;

decoding the second burst of signal by applying a first space frequency block code format in which a transmission matrix $T_1$ is established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

where $T_{ij}$ represents the symbol to be transmitted on the ith antenna and the jth subcarrier;

determining whether the second burst of signal is successfully decoded;

when the second burst of signal is not successfully decoded, softly combining the first burst of signal and the second burst of signal to generate a combined signal, and decoding the combined signal by applying the first space frequency block code format to the first burst of signal, and applying a second space frequency block code format to the second burst of signal, with a transmission matrix $T_2$ within the second space frequency block code format being established by:

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier;

determining whether the combined signal is successfully decoded; and when the combined signal is not successfully decoded, buffering the second burst of signal.

29. A method for decoding signal in a communication system, the method comprising the steps of:

receiving a first burst of signal and a second burst of signal within a radio subframe;

decoding the second burst of signal by applying a first space frequency block code format in which a transmission matrix $T_1$ and a transmission matrix $T_2$ are sequentially applied in a frequency domain, with the transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier;

determining whether the second burst of signal is successfully decoded;

when the second burst of signal is not successfully decoded, softly combining the first burst of signal and the second burst of signal to generate a combined signal, and decoding the combined signal by applying the first space frequency block code format to the first burst of signal, and applying a second space frequency block code format to the second burst of signal, with, in the second space frequency block code format, the transmission matrix $T_2$ and the transmission matrix $T_1$ being sequentially applied in the frequency domain;

determining whether the combined signal is successfully decoded; and when the combined signal is not successfully decoded, buffering the second burst of signal.

30. A method for transmission in a communication system, the method comprising:

modulating data to be transmitted by using a certain modulation scheme to generate a plurality of modulated symbols;

establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a frequency domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier; and transmitting the four symbols $S_1$, $S_2$, $S_3$ and $S_4$ via four antennas in accordance with the transmit diversity scheme.

31. A method for transmission in a communication system, the method comprising:

modulating data to be transmitted by using a certain modulation scheme to generate a plurality of modulated symbols;

establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a time domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier; and transmitting the four symbols $S_1$, $S_2$, $S_3$ and $S_4$ via four antennas in accordance with the transmit diversity scheme.

32. A method for transmission in a communication system, the method comprising:

modulating data to be transmitted by using a certain modulation scheme to generate a plurality of modulated symbols;

establishing a transmit diversity scheme for at least a group of four symbols $S_1$, $S_2$, $S_3$ and $S_4$ from among the plurality of modulated symbols by alternatively applying two transmission matrices $T_1$ and $T_2$ in both of a time domain and a frequency domain, with the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier; and transmitting the four symbols $S_1$, $S_2$, $S_3$ and $S_4$ via four antennas in accordance with the transmit diversity scheme.

33. A wireless terminal in a communication system, comprising:

a modulation unit modulating data to be transmitted by using a certain modulation scheme to generate a plurality of modulated symbols;

a processing unit establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a frequency domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and four antennas transmitting the four symbols $S_1$, $S_2$, $S_3$ and $S_4$ in accordance with the transmit diversity scheme.

34. The wireless terminal of claim 33, comprised of the processing unit exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

35. The wireless terminal of claim 33, comprised of the wireless terminal transmitting the four symbols as a burst of signal in a primary broadcast channel, with the transmission being in accordance with the transmit diversity scheme.

36. A wireless terminal in a communication system, comprising:

a modulation unit modulating data to be transmitted by using a certain modulation scheme to generate a plurality of modulated symbols;

a processing unit establishing a transmit diversity scheme for at least a group of four symbols $S_1$, $S_2$, $S_3$ and $S_4$ from among the plurality of modulated symbols, with the transmit diversity scheme being established such that two transmission matrices $T_1$ and $T_2$ are alternatively applied in a time domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and four antennas transmitting the four symbols $S_1$, $S_2$, $S_3$ and $S_4$ in accordance with the transmit diversity scheme.

37. The wireless terminal of claim 36, comprised of the processing unit exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

38. The wireless terminal of claim 36, comprised of the transmit diversity scheme being established such that the four symbols are repeatedly transmitted in the time domain for two times, with:
   one of the two transmission matrices $T_1$ and $T_2$ being applied to the first transmission in a first time slot; and
   the other one of the two transmission matrices $T_1$ and $T_2$ being applied to the second transmission in a second time slot.

39. The wireless terminal of claim 38, comprised of the wireless terminal transmitting the symbols in both of the first time slot and the second time slot as one burst of signal in a primary broadcast channel transmission, with the first time slot and the second time slot being located within the same subframe.

40. The wireless terminal of claim 38, comprised of the wireless terminal:
   transmitting the symbols in the first time slot as a first burst of signal in a primary broadcast channel transmission; and
   transmitting the symbols in the second time slot as a second burst of signal in the primary broadcast channel transmission, with the first burst and the second burst being separated by a certain time interval.

41. A wireless terminal in a communication system, comprising:
   a modulation unit modulating data to be transmitted by using a certain modulation scheme to generate a plurality of modulated symbols;
   a processing unit establishing a transmit diversity scheme for at least a group of four symbols $S_1, S_2, S_3$ and $S_4$ from among the plurality of modulated symbols by alternatively applying two transmission matrices $T_1$ and $T_2$ in both of a time domain and a frequency domain, with the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier; and
   four antennas transmitting the four symbols $S_1, S_2, S_3$ and $S_4$ in accordance with the transmit diversity scheme.

42. The wireless terminal of claim 41, comprised of the processing unit exchanging the second row and the third row of each of the transmission matrices $T_1$ and $T_2$, such that the symbols on the second row of each of the transmission matrices $T_1$ and $T_2$ are transmitted via the third antenna, and the symbols on the third row of each of the transmission matrices are transmitted via the second antenna.

43. The wireless terminal of claim 41, with the transmit diversity scheme being established such that the four symbols are repeatedly transmitted in the frequency domain over eight subcarriers, and are repeatedly transmitted in the time domain for two times over two time slots, with:
   in a first time slot, a first one of the transmission matrix matrices $T_1$ and $T_2$ being applied to the first four subcarriers, and a second one of the transmission matrix matrices $T_1$ and $T_2$ being applied to the last four subcarriers; and
   in a second time slot, the second one of the transmission matrix matrices $T_1$ and $T_2$ being applied to the first four subcarriers, and the first one of the transmission matrix matrices $T_1$ and $T_2$ being applied to the last four subcarriers.

44. The wireless terminal of claim 41, with the transmit diversity scheme being established such that the four symbols are repeatedly transmitted for four times over eight subcarriers four time slots, with:
   in a first time slot, a first one of the transmission matrix matrices $T_1$ and $T_2$ being applied to the first four subcarriers;
   in a second time slot, a second one of the transmission matrix matrices $T_1$ and $T_2$ being applied to the last four subcarriers;
   in a third time slot, the first one of the transmission matrix matrices $T_1$ and $T_2$ being applied to the first four subcarriers; and
   in a fourth time slot, the second one of the transmission matrix matrices $T_1$ and $T_2$ being applied to the last four subcarriers.

45. A wireless terminal a communication system, comprising:
   a memory unit storing a first burst of signal and a second burst of signal that are received within a radio subframe; and
   a decoding unit decoding the received signals, with the decoding unit:
      decoding the second burst of signal by applying a first space frequency block code format in which a transmission matrix $T_1$ is established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

where $T_{ij}$ represents the symbol to be transmitted on the ith antenna and the jth subcarrier;
      determining whether the second burst of signal is successfully decoded; and
      when the second burst of signal is not successfully decoded, softly combining the first burst of signal and the second burst of signal to generate a combined signal, and decoding the combined signal by applying the first space frequency block code format to the first burst of signal, and applying a second space frequency block code format to the second burst of signal, with a transmission matrix $T_2$ within the second space frequency block code format being established by:

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier.

46. A wireless terminal in a communication system, comprising:
   a memory unit storing a first burst of signal and a second burst of signal that are received within a radio subframe; and
   a decoding unit decoding the received signals, with the decoding unit:
      decoding the second burst of signal by applying a first space frequency block code format in which a transmission matrix $T_1$ and a transmission matrix $T_2$ are sequentially applied in a frequency domain, with the transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix},$$

$$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \begin{bmatrix} S_3 & S_4 & 0 & 0 \\ -S_4^* & S_3^* & 0 & 0 \\ 0 & 0 & S_1 & S_2 \\ 0 & 0 & -S_2^* & S_1^* \end{bmatrix},$$

where $T_{ij}$ represents the symbol to be transmitted on the ith antenna and the jth subcarrier;
   determining whether the second burst of signal is successfully decoded; and
   when the second burst of signal is not successfully decoded, softly combining the first burst of signal and the second burst of signal to generate a combined signal, and decoding the combined signal by applying the first space frequency block code format to the first burst of signal, and applying a second space frequency block code format to the second burst of signal, with, in the second space frequency block code format, the transmission matrix $T_2$ and the transmission matrix $T_1$ being sequentially applied in the frequency domain.

47. A wireless terminal in a communication system, comprising:
   a modulation unit modulating data to be transmitted by using a certain modulation scheme to generate a plurality of modulated symbols;
   a processing unit establishing a transmit diversity scheme for at least a group of four symbols $S_1, S_2, S_3$ and $S_4$ from among the plurality of modulated symbols, with the transmit diversity scheme being established such that two transmission matrices $T_1$ and $T_2$ are alternatively applied in a frequency domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier; and
   four antennas transmitting the four symbols $S_1, S_2, S_3$ and $S_4$ in accordance with the transmit diversity scheme.

48. A wireless terminal in a communication system, comprising:
   a modulation unit modulating data to be transmitted by using a certain modulation scheme to generate a plurality of modulated symbols;
   a processing unit establishing a transmit diversity scheme for at least a group of four symbols $S_1, S_2, S_3$ and $S_4$ from among the plurality of modulated symbols, with the transmit diversity scheme being established such that two transmission matrices $T_1$ and $T_2$ are alternatively applied in a time domain, and the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier; and
   four antennas transmitting the four symbols $S_1, S_2, S_3$ and $S_4$ in accordance with the transmit diversity scheme.

49. A wireless terminal in a communication system, comprising:
   a modulation unit modulating data to be transmitted by using a certain modulation scheme to generate a plurality of modulated symbols;
   a processing unit establishing a transmit diversity scheme for at least a group of four symbols $S_1, S_2, S_3$ and $S_4$ from among the plurality of modulated symbols by alternatively applying two transmission matrices $T_1$ and $T_2$ in both of a time domain and a frequency domain, with the two transmission matrices $T_1$ and $T_2$ being respectively established by:

$$T_1 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_2 & S_1^* & S_2 & S_1^* \\ S_3 & -S_4^* & -S_3 & S_4^* \\ S_4 & S_3^* & -S_4 & -S_3^* \end{bmatrix},$$

and $$T_2 = \begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & -S_2^* & S_1 & -S_2^* \\ S_3 & -S_4^* & -S_3 & S_4^* \\ S_2 & S_1^* & S_2 & S_1^* \\ S_4 & S_3^* & -S_4 & -S_3^* \end{bmatrix},$$

where $T_{ij}$ represents the symbol to be transmitted on the ith antenna and the jth subcarrier; and four antennas transmitting the four symbols $S_1$, $S_2$, $S_3$ and $S_4$ in accordance with the transmit diversity scheme.

* * * * *